US010083085B2

(12) United States Patent
Le Moal

(10) Patent No.: US 10,083,085 B2
(45) Date of Patent: *Sep. 25, 2018

(54) INDIRECTION DATA STRUCTURES TO MANAGE FILE SYSTEM METADATA

(71) Applicant: WESTERN DIGITAL TECHNOLOGIES, INC., Irvine, CA (US)

(72) Inventor: Damien Cyril Daniel Le Moal, Tokyo-to (JP)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,239

(22) Filed: May 15, 2017

(65) Prior Publication Data

US 2017/0277591 A1  Sep. 28, 2017

Related U.S. Application Data

(63) Continuation of application No. 14/615,913, filed on Feb. 6, 2015, now Pat. No. 9,690,793.

(51) Int. Cl.
G06F 17/30 (2006.01)
G06F 11/14 (2006.01)
G05B 19/042 (2006.01)
G06F 12/02 (2006.01)
G06F 12/06 (2006.01)
(Continued)

(52) U.S. Cl.
CPC ...... *G06F 11/1435* (2013.01); *G05B 19/0423* (2013.01); *G06F 3/064* (2013.01); *G06F 3/0619* (2013.01); *G06F 12/0223* (2013.01); *G06F 12/06* (2013.01); *G06F 12/0802* (2013.01); *G06F 12/10* (2013.01); *G06F 17/30* (2013.01);
(Continued)

(58) Field of Classification Search
None
See application file for complete search history.

(56) References Cited

U.S. PATENT DOCUMENTS 7,685,360 B1  3/2010  Brunnett et al.
8,612,706 B1  12/2013  Madril
(Continued)

OTHER PUBLICATIONS

Jin, Chao et al., "HiSMRfs: a High Performance File System for Shingled Storage Array", Data Storage Institute—Agency of Science, Technology and Research, 6 pages.
(Continued)

*Primary Examiner* — Anh Tai Tran

(57) ABSTRACT

Described herein are systems, methods, and software to manage metadata in a data storage device. In one example, a data storage device includes a first storage zone, a shingled magnetic recording (SMR) zone, and a storage control system. The storage control system is configured to maintain metadata in a metadata location of the first storage zone for user data in the SMR zone. The storage control system is further configured to, responsive to a usage condition being satisfied for the metadata in the metadata location, identify metadata locations in the SMR zone to redirect and store the metadata. The storage control system is also configured to maintain an indirection data structure in the metadata location of the first zone that correlates the metadata locations in the SMR zone to the metadata.

21 Claims, 8 Drawing Sheets

(51) Int. Cl.
G06F 12/0802 (2016.01)
G06F 12/10 (2016.01)
G06F 3/06 (2006.01)

(52) U.S. Cl.
CPC .. *G06F 17/30067* (2013.01); *G06F 17/30997* (2013.01)

(56) References Cited

U.S. PATENT DOCUMENTS

| | | |
|---|---|---|
| 8,719,632 B2 | 5/2014 | Hall |
| 8,756,361 B1 | 6/2014 | Carlson et al. |
| 2014/0019680 A1* | 1/2014 | Jin .......................... G11B 5/012 711/112 |

OTHER PUBLICATIONS

"A proposal for making ext4's journal more SMR (and flash) friendly", retrieved from internet site http://lwn.net/Articles/579564/ on Feb. 5, 2015, 3 pages.

Flouris, Michail D., "Extensible Networked-Storage Virtualization With Metadata Management at the Block Level", Thesis submitted at the University of Toronto, 2009, 191 pages.

* cited by examiner

| INDIRECTION TABLE 500 | |
|---|---|
| LOGICAL ADDRESSES 510 | PHYSICAL ADDRESSES 520 |
| 1 | PMR ADDRESS 521 |
| 2 | PMR ADDRESS 522 |
| 3 | PMR ADDRESS 523 |
| ... | ... |
| n | SMR ADDRESS 524 |
| n+1 | SMR ADDRESS 525 |
| n+2 | SMR ADDRESS 526 |
| ... | ... |

INDIRECTION DATA STRUCTURES TO MANAGE FILE SYSTEM METADATA

RELATED APPLICATIONS

This application is a continuation of and claims priority to U.S. application Ser. No. 14/615,913, filed on Feb. 6, 2015, and entitled INDIRECTION DATA STRUCTURES TO MANAGE FILE SYSTEM METADATA, which is hereby incorporated by reference in its entirety.

TECHNICAL BACKGROUND

Storage devices, such as hard disk drives and solid state drives, provide storage media for host processing systems to store and read various data objects. These data objects may include images, videos, word documents, spreadsheets, and various other file types capable of being processed by the host processing system. To make storage media available to the host system, one or more of the storage devices may be communicatively coupled to the system using a Small Computer System Interface (SCSI) bus, a Serial Attached SCSI (SAS) bus, a Serial ATA (SATA) bus, a Peripheral Component Interconnect Express (PCIe) bus, Fibre Channel, or some other similar interface or bus.

In some examples, hard disk drives may include a combination of perpendicular magnetic recording (PMR) zones and shingled magnetic recording (SMR) zones. PMR zones read and write data to individual tracks that are separated from one another to prevent data from being overwritten. In contrast, SMR works by writing a set of tracks closely together in parallel on the hard disk, similar to roof shingles, allowing data from one track to partially overwrite data on another track. Accordingly, data that is written to the SMR portion of the disk drive must be prevented from entirely overwriting data previously stored in the storage media.

In addition to the user data stored on a storage device, file system metadata might also be stored that includes the file or directory name, the length of the contents of a file, and the location of the file in the folder hierarchy, among other possible file or directory metadata. However, as hard disk densities increase and SMR drives increase in popularity, the storage of metadata for the SMR zones can be challenging.

OVERVIEW

Examples disclosed herein provide systems, methods, and software to manage metadata in a data storage device. In one example a data storage device with rotating magnetic storage media having a first storage zone and a shingled magnetic recording (SMR) zone includes a storage control system configured to maintain metadata in a metadata location of the first storage zone for user data that is stored in the SMR zone. Responsive to a usage condition being satisfied for the metadata in the metadata location, the storage control system is further configured to identify one or more metadata locations in the SMR zone to redirect storage of at least a subset of the metadata, and store at least the subset of the metadata in the one or more metadata locations in the SMR zone. The storage control system is also configured to maintain an indirection data structure in the metadata location of the first zone that correlates the one or more metadata locations in the SMR zone to the metadata.

In a further example, an apparatus to manage metadata in a data storage device, the data storage device having a first storage zone and a SMR zone, includes one or more non-transitory computer readable media. The apparatus further includes processing instructions stored on the one or more non-transitory computer readable media that, when executed by a processing system, direct the processing system to maintain the metadata in a metadata location of the first storage zone for user data that is stored in the SMR zone. The processing instructions further direct the processing system to, in response to a usage condition being satisfied for the metadata in the metadata location, identify one or more metadata locations in the SMR zone to redirect storage of at least a subset of the metadata, and store at least the subset of the metadata in the one or more metadata locations in the SMR zone. The processing instructions also direct the processing system to maintain an indirection data structure in the metadata location of the first zone that correlates the one or more metadata locations in the SMR zone to the metadata.

In another example, a data system to manage metadata on a data storage device includes a first storage zone on the data storage device and a SMR zone on the data storage device. The data system also includes a processing system configured to maintain the metadata in a metadata location of the first storage zone for the user data that is stored in the SMR zone and, in response to a usage condition being satisfied for the metadata in the metadata location, identify one or more metadata locations in the SMR zone to redirect storage of at least a subset of the metadata, and store at least the subset of the metadata in the one or more metadata locations in the SMR zone. The processing system is further configured to maintain an indirection data structure in the metadata location of the first zone that correlates the one or more metadata locations in the SMR zone to the metadata.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 5 illustrates an indirection table according to one example.

DETAILED DESCRIPTION

Figure 1:
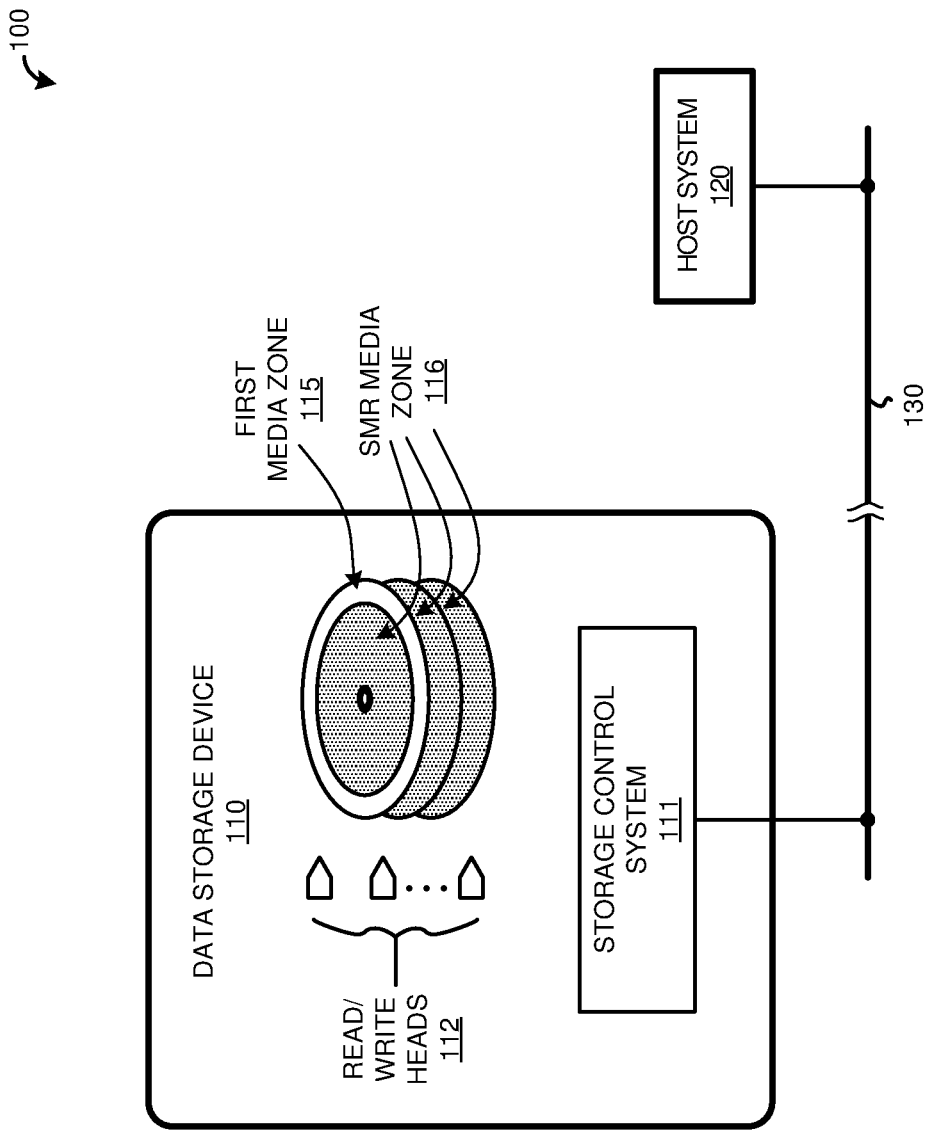
FIG. 1 illustrates a data system to manage file system metadata.

Storage devices, such as hard disk drives and solid state drives, are often used in computing systems to store data objects for a host processing system. These data objects often include audio files, video files, word documents, spreadsheets, images, or any other type of file. To make a storage device available to the host processing system, the storage device must be communicatively linked to a host processing system to enable communications between the two systems. This communication link may include a Small Computer System Interface (SCSI) bus, a Serial Attached SCSI (SAS) bus, a Serial ATA (SATA) bus, a Peripheral Component Interconnect Express (PCIe) bus, Fibre Channel, or some other similar interface or bus.

In the present example, a storage device includes a perpendicular magnetic recording (PMR) zone, or some other non-shingled track type recording zone, and a shingled magnetic recording (SMR) zone. PMR zones read and write data to individual tracks without overlap of adjacent tracks to prevent previously written data from being inadvertently corrupted by write operations. In contrast, SMR works by writing adjacent tracks with a slight overlap on the hard disk, similar to roof shingles. Thus, data from one track may partially overlay data on another track. By overlapping the tracks, a higher density track arrangement is achieved and more user data may be stored to the same physically sized disk. However, the tight spacing and overlapping of tracks in SMR zones can require more structured or managed write operations, as writing a first track can affect previously written data of an adjacent overlapping track. Thus, SMR zones typically are written in bursts for large portions of a track to minimize corruption of previously written data.

In the example of a disk drive that includes both PMR and SMR zones, metadata for the data objects or files may be stored in the PMR zone although the user data may be located in the SMR zone. However, as metadata quantity increases due to higher storage densities of disk drives with SMR zones, the PMR zone may not have the necessary storage space for the metadata.

To manage the file system for the PMR and SMR device, file system metadata is stored in the PMR portion, allowing a host to identify, find, and alter metadata in accordance with changes in user data on the device. To make more space for the metadata, a storage control system, located on the device or implemented as a process within the host processing system, may identify that a usage condition is satisfied for the file system metadata. This condition may include the metadata occupying a predetermined amount of storage locations, the PMR zone of the disk reaching a predetermined amount of used space, or any other similar usage condition. Once the condition is satisfied, one or more locations within the SMR zone may be identified to store at least a portion of the metadata, and the metadata may be stored within the identified SMR storage locations.

In response to storing at least a portion of the metadata to the SMR zone, an indirection data structure may be maintained in the PMR zone that manages or identifies the locations of the various file system metadata on the disk. For example, when a host generates a file system metadata request, the indirection data structure may be used to identify the location of the metadata in either the PMR or SMR zone of the device. Once the location is identified, the data may be retrieved from the PMR or SMR portion. In some examples, to determine which metadata objects should be stored within the SMR zone of the device, the storage control system may identify the metadata objects that have not been recently requested or modified. Thus, metadata that is not likely to be modified may be stored in the SMR zone of the device, while metadata that is more likely to be modified may be stored in the PMR zone of the device.

To further demonstrate the storage of file system metadata within a storage device, FIG. 1 is provided. FIG. 1 illustrates a data system 100 to manage file system metadata. Data system 100 includes data storage device 110 and host system 120. Data storage device 110 further includes first media zone 115, which may comprise a PMR zone or some other non-shingled track type, SMR media zone 116, read and write heads 112, and storage control system 111. Read and write heads 112 can read and write data to media zones 115-116, and are communicatively coupled to storage control system 111 or other elements of data storage device 110. Data storage device 110 and storage control system 111 communicate with host system 120 over communication link 130.

In operation, data storage device 110 can store computer-readable data for later retrieval, such as user data, system data, swap file data, and the like. Host system 120 can control at least data storage and retrieval operations of data storage device 110 over bus 130, as well as control the transfer of data to other systems and equipment, such as processing systems, network interfaces, and the like.

As mentioned above, during the operation of data storage device 110, file system metadata may be stored on the device that corresponds to the user data also stored on the device. This metadata information may include file names, file sizes, directory information for each of the files, among a variety of other information. The metadata may be stored as one or more index node (inode) data structures, file allocation tables (FATs), or some other data structure capable of managing the metadata for the file system. Here, the file system metadata is initially stored in first media zone 115 to reflect the user data that is stored in SMR media zone 116. As more data is stored to data storage device 110, first media portion 115 may be unable to store all of the metadata for the file system. Accordingly, storage control system 111 may initiate a transfer of at least a subset of the metadata to SMR media zone 116. Although illustrated within data storage device 110, it should be understood that the metadata operations of storage control system 111 might be implemented wholly or partially as a process within host system 120.

Figure 2:
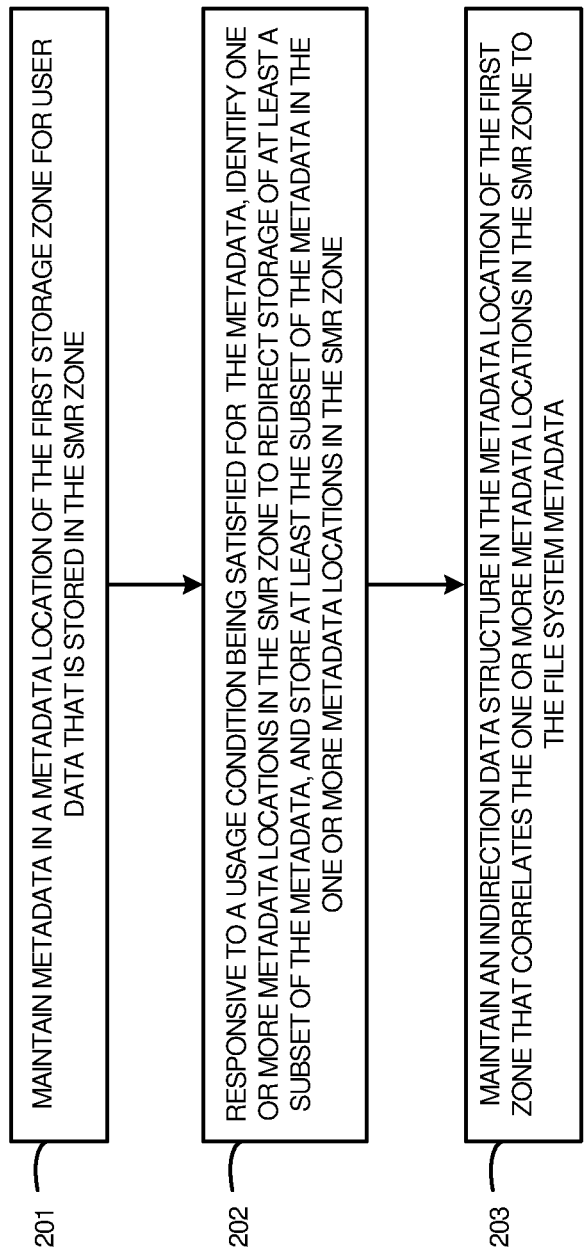
FIG. 2 illustrates a method of operating a storage control system to manage file system metadata.

To illustrate the operations of storage system 100, FIG. 2 is provided. FIG. 2 illustrates a method of operating a storage control system to manage file system metadata. The operations of FIG. 2 are referenced parenthetically below. In FIG. 2, storage control system 111 maintains (201) file system metadata in a metadata location of first media zone 115 for user data that is stored in SMR media zone 116. This metadata is used by host system 120 to identify the location, size, name, and other information about each object of user data stored on the device. Responsive to a usage condition being satisfied for the file system metadata in the location, storage control system 111 identifies (202) one or more metadata locations in SMR media zone 116 to redirect storage of at least a subset of the file system metadata, and stores at least the subset of the file system metadata in the one or more locations of SMR media zone 116.

In some examples, first media zone 115 may fail to include enough storage space to store file system metadata for all user data in SMR media zone 116. Accordingly, storage control system 111 may identify when a usage condition is satisfied for the metadata and direct storage of at least a portion of the metadata to SMR media zone 116. This condition may include a predetermined amount of metadata being stored in first media zone 115, a predetermined amount of total data in first media zone 115, or any other similar storage condition related to first media zone 115.

Once the subset of metadata is directed to SMR media zone 116, storage control system 111 maintains (203) an indirection data structure in the metadata location of first media zone 115 that correlates the one or more metadata locations in SMR media zone 116 to the file system metadata. In at least one instance, the indirection data structure comprises an indirection table configured to relate logical block addresses (LBAs) from a file system of host system 120 to the physical block addresses (PBAs) of the file system metadata in SMR media zone 116. Thus, host system 120 may identify the location of the indirection data structure and use the data structure to identify the locations of the metadata within SMR media zone 116. Further, in some instances, the indirection table may include entries for the metadata in first media zone 115 in addition to entries for the metadata within SMR media zone 116. Accordingly, when a metadata request is identified from host system 120, the data structure may be used to direct the request to both media zones 115-116.

Although illustrated as part of storage device 110 in FIG. 1, it should be understood that the described operations of storage control system 111 might be implemented wholly or partially as a process on host system 120. For example, host system 120 might include a file system with the ability to manage an indirection data table and store metadata in both media zones 115-116.

Figure 3A:
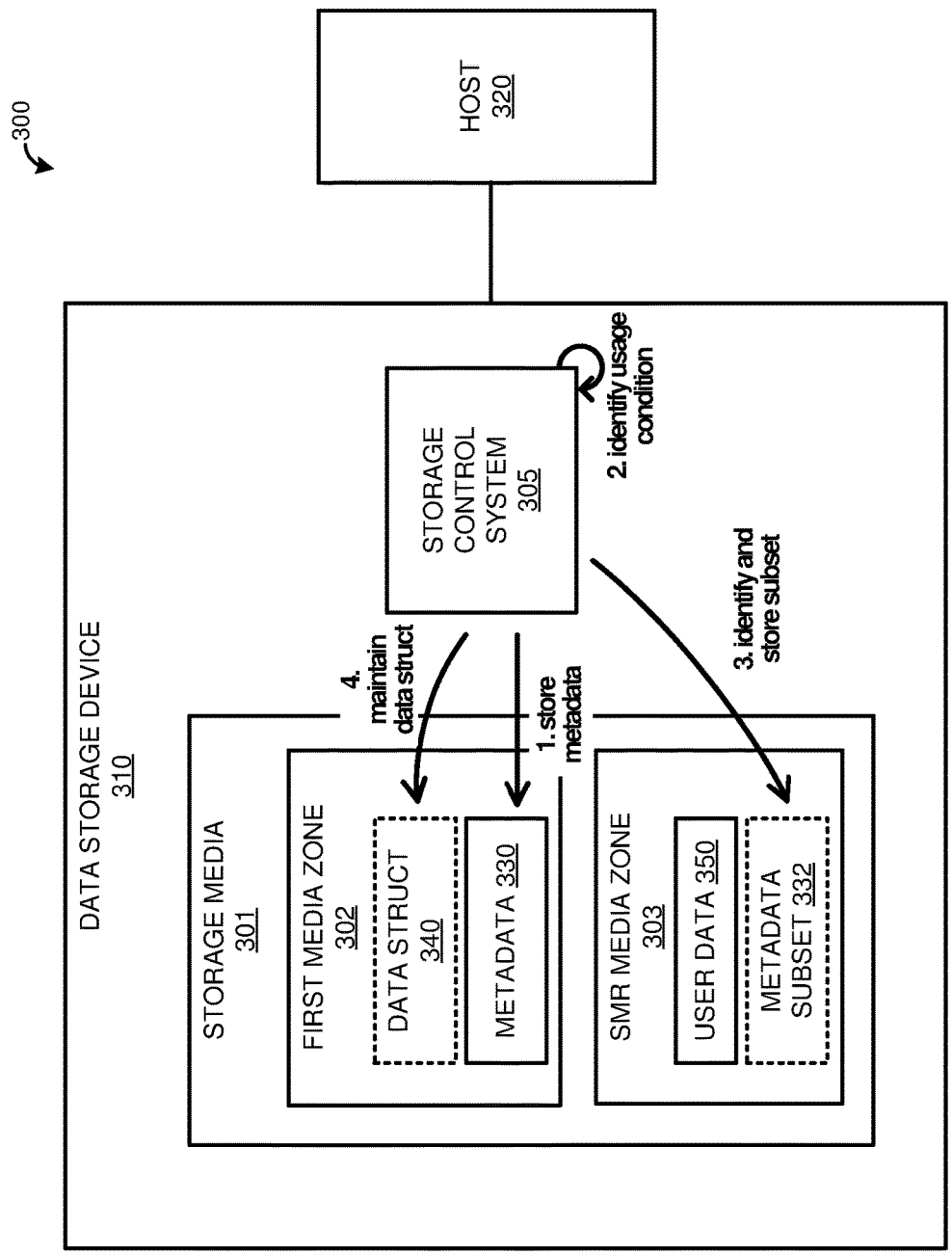
FIG. 3A illustrates an overview of managing file system metadata in a data storage device.

Referring now to FIG. 3A, FIG. 3A illustrates an overview 300 of managing file system metadata in a data storage device. Overview 300 includes data storage device 310 and host 320. Data storage device 310 further includes storage media 301, first media zone 302, which may comprise a PMR media zone in some examples, SMR media zone 303, and storage control system 305. Storage control system 305 includes processing instructions that direct data storage device 310 to store user data 350 and metadata 330 for host 320 as described herein.

In particular, storage control system 305 stores file system metadata 330 in first media zone 302, which corresponds to user data 350 that is stored in SMR media zone 303. This metadata may include the name of a file or directory, the size of the file, the time the file or directory was created or modified, or other similar file system metadata. As more user data is stored to SMR media zone 303, first media zone 302 may not include adequate storage to properly manage the file system metadata related to the new user data. Accordingly, storage control system 305 is configured to identify when a usage condition is satisfied for the file system metadata stored in first media zone 302. This identification may occur when the metadata uses a predefined amount of storage in first media zone 302, when a predefined amount of storage is exhausted with all data within first media zone 302, or any other usage basis for first media zone 302.

In response to the condition being satisfied, storage control system 305 identifies metadata subset 332, which is a subset of metadata 330, and initiates storage of metadata subset 332. In some instances, metadata subset 332 may be identified based on when the metadata was last modified or created. Accordingly, metadata that meets a modification criteria related to the time that the metadata was modified may be transferred and stored within SMR media zone 303. For example, storage control system 305 may identify a subset of metadata that was modified least recently, and store the metadata in SMR media zone 303. Similarly, because directory metadata may be modified more often than file metadata, a subset of file metadata may be stored in SMR media zone 303, while the directory metadata remains in first media zone 302.

As metadata subset 332 is transitioned to SMR media zone 303, storage control system 305 maintains indirection data structure 340 to manage the locations of the file system metadata in SMR media zone 303. Data structure 340 allows requests from host 320 to be translated and directed to an appropriate storage location in first media zone 302 or SMR media zone 303. For example, storage control system 305 may report a fixed location of data structure 340 to host 320. In response to this report, a file system in the host may inquire data structure 340 to determine the locations of metadata in storage media 301, identify or read the metadata in storage media 301, or modify metadata in storage media 301.

Figure 3B:
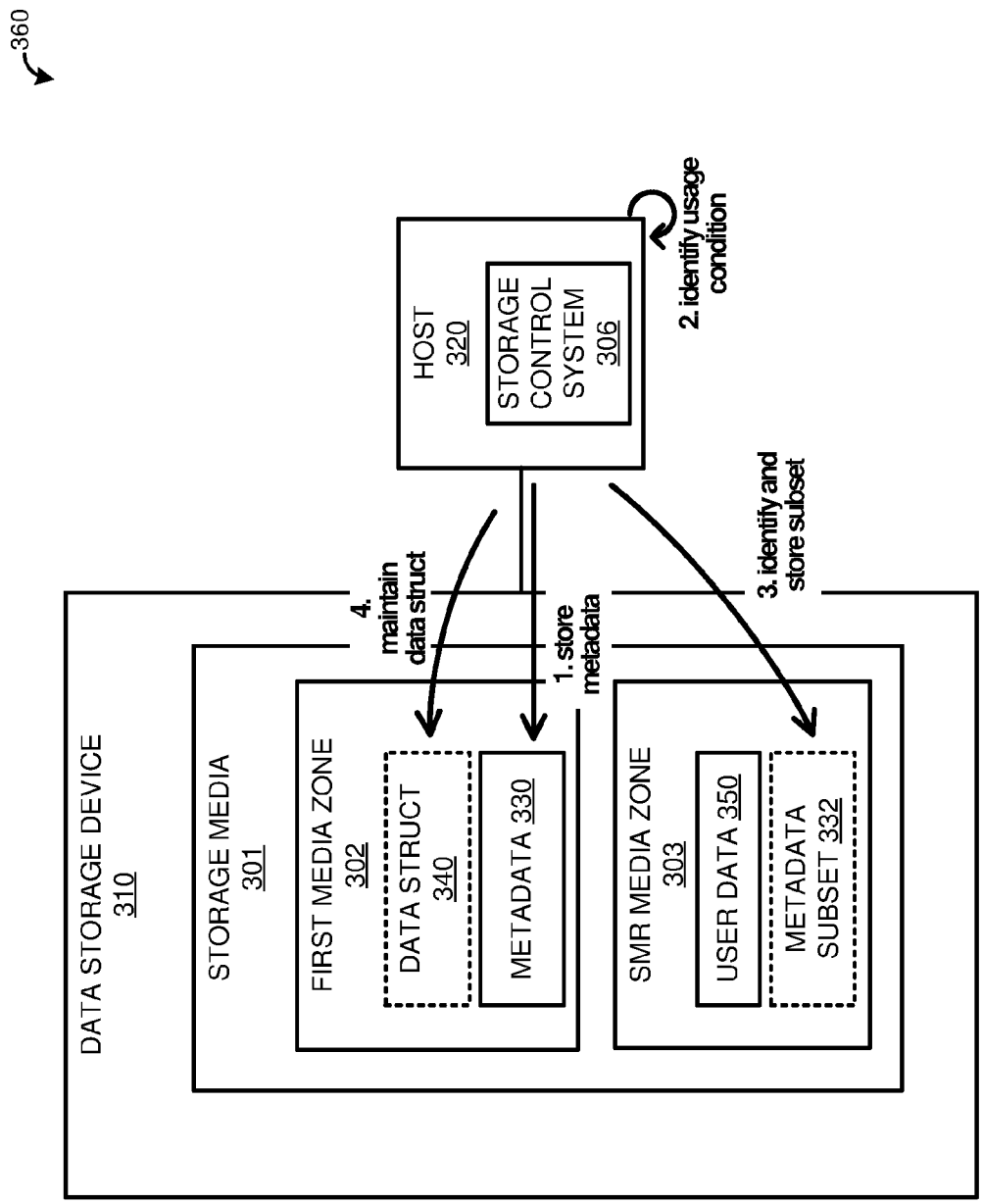
FIG. 3B illustrates an overview of managing file system metadata in a data storage device.

As an alternative example of a storage control system, FIG. 3B is provided. FIG. 3B illustrates an overview 360 of managing file system metadata in a data storage device. Here, overview 360 includes storage control system 306 as opposed to storage control system 305 from FIG. 3A. Storage control system 306 executes within host 320 as a process to provide at least similar operations as described for storage control system 305. In at least one example, storage control system 306 may comprise a file system process configured to store and manage user data and file system metadata on storage device 310.

In particular, storage control system 306 may, when implemented as a process on host 320, maintain file system metadata 330 in a metadata location of first media zone 302 for user data 350 that is stored in SMR media zone 303. Storage control system 306 may further identify when a usage condition is satisfied for file system metadata 330, and identify one or more metadata locations in SMR media zone 303 to redirect storage of at least a subset of file system metadata 330. Further, storage control system 306 may maintain data structure 340 in first media zone 302 that correlates the one or more metadata locations in SMR media zone 303 to the file system metadata. Thus, when host 320 requests particular file system information, the host may reference data structure 340 to determine the location of the data in first media zone 302 or SMR media zone 303.

Figure 4:
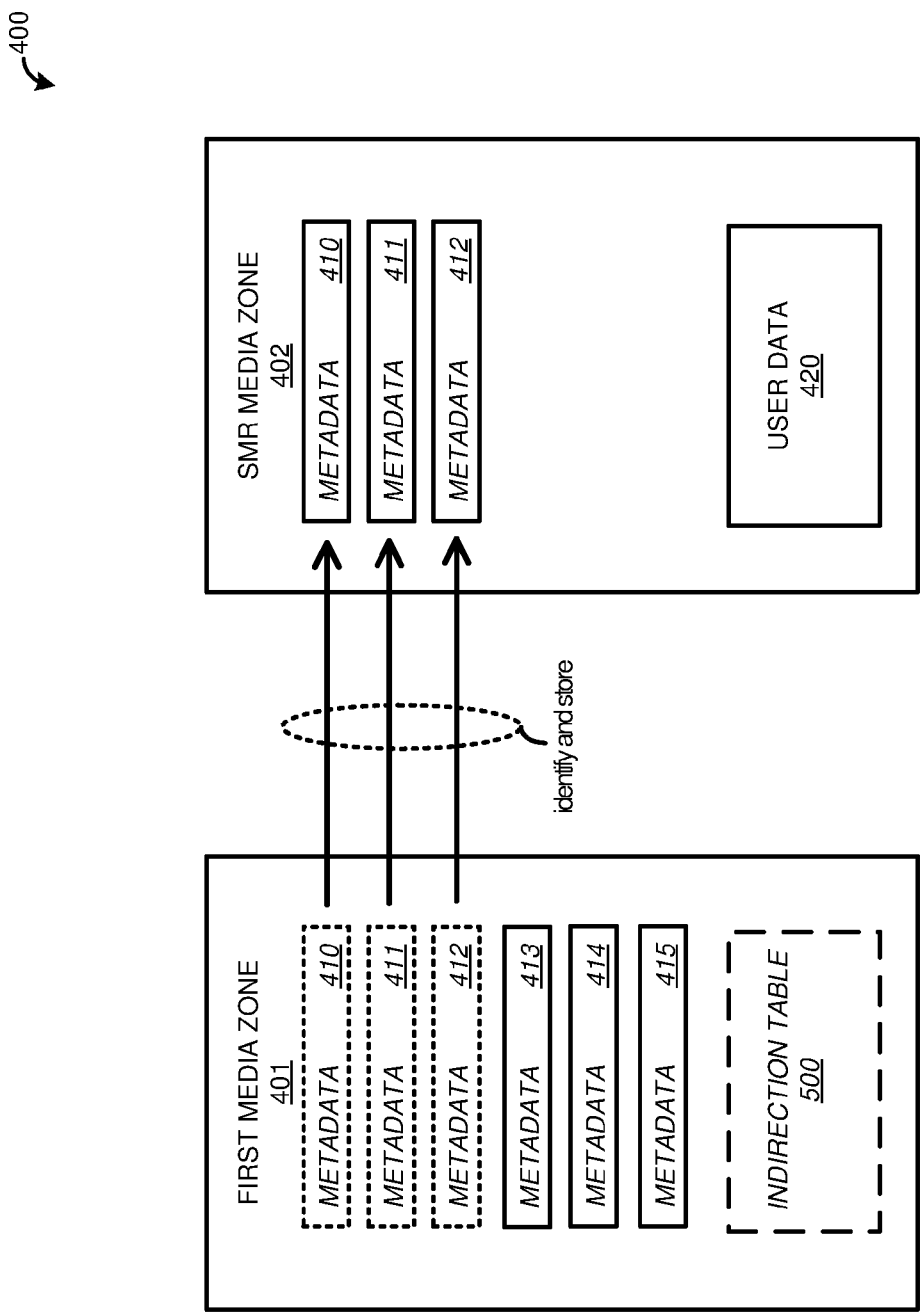
FIG. 4 illustrates an overview of storing file system metadata in a data storage device.

To further illustrate the operation of a storage control system, FIG. 4 is provided. FIG. 4 illustrates an overview 400 of storing file system metadata in a data storage device according to one example. Overview 400 includes first media zone 401 and SMR media zone 402. As illustrated, first media zone 401 stores indirection table 500 and metadata objects 410-415 that corresponds to user data 420, although other amounts of metadata may be stored in some examples. During the operation of the storage device, a storage control system, implemented in the storage device or in the host, may identify that a usage criteria is satisfied for the file system metadata. This usage criteria may include a particular amount of metadata being stored in first media zone 401, a predetermined amount of total data being stored in first media zone 401, or any other usage information related to the amount of data in first media zone 401. In other instances, rather than referring to the amount of data in first media zone 401, the usage condition may be based on a periodic time to transition metadata to SMR media zone 402. For instance, the storage control system may be configured to shift metadata to SMR media zone 402 every ten minutes, or some other periodic schedule.

In response to identifying that the usage condition is satisfied, the storage control system identifies one or more metadata locations in SMR media zone 402 for storage of at least a subset of metadata 410-415. Once the locations are determined, the subset of metadata, which in this case includes metadata 410-412, is transferred to SMR media zone 402. Upon storing the metadata in the SMR zone, metadata 410-412 in first media zone 401 may be deleted to provide a greater amount of storage space in the first media zone. In some examples, the determination of the subset of metadata may be based on how recent the metadata has been modified by the host or storage control systems. Accordingly, the metadata that was modified least recently may be selected to be stored in SMR media zone 402. Further, the determination on how large the subset of metadata that is stored in SMR media zone 402 may be based on how many metadata items qualify based on the last time they were modified, may be based on the amount of space required in first media zone 401, may be based on the maximum amount of metadata permitted in first media zone 401, or may be determined based on any other factor.

In addition to migrating at least a subset of the metadata to SMR media zone 402, the storage control system is also configured to manage indirection table 500. Indirection table 500 allows a host system, such as host system 120 from FIG. 1, to reference the table using a first address, which would then be translated into the physical address of the file system metadata. Referring to FIG. 4, the indirection table may include entries for metadata 410-415. Once the data is migrated to the SMR zone of the device, indirection table 500 may be used to identify metadata 410-412 in SMR media zone 402, and metadata 413-415 in first media zone 401.

Although not illustrated in the present example, it should be understood that metadata might be transferred back from SMR media zone 402 to first media zone 401. For example, metadata may be generated when a user first generates a file, however, the metadata may not be modified for a long period of time as the user has not updated or changed the original file. Accordingly, the storage control system may transfer the metadata to SMR media zone 402 to make more storage space in first media zone 401. Once stored in SMR media zone 402, the user may modify the file, resulting in changes to the metadata. Accordingly, rather than leaving the metadata in SMR media zone 402, the metadata may be returned to the first zone of the media.

Turning to FIG. 5 to further illustrate the implementation of indirection table 500 from overview 400. Indirection table 500 includes logical addresses 510 and physical addresses 520. Logical addresses 510 include a range of data addresses accessible by a host system to identify file system metadata, and physical addresses 520 correspond to the physical data addresses of the file system metadata within the storage device.

As described in FIG. 4, file system metadata may be transferred from a first storage location in a first media zone to one or more storage locations in a SMR media zone. Once the metadata is transferred, the location of the metadata must be maintained to provide a host system with metadata that accurately reflects the state of the user data. As illustrated in indirection table 500, a first set of entries is provided to PMR addresses 521-523, and a second set or remaining set of entries is provided to SMR addresses 524-526. By maintaining indirection table 500, the storage control system on the storage device may provide the location of the table to the host, allowing the host to query the table to identify various file system metadata.

Referring to the example in FIG. 4, metadata 410-412 is transferred and stored in SMR media zone 402. As the data is stored, indirection table 500 must be updated to reflect the current location of the metadata. Consequently, three entries within indirection table 500 must be updated to reflect the new locations of metadata 410-412. By maintaining indirection table 500, the table in first media zone 401 may be referenced for all of the metadata requests, while the metadata information may be stored in the SMR zone of the storage device.

Although illustrated in the example of FIG. 5 as including six entries, it should be understood that the entries might be dynamic in some examples. For example, as user data is changed or added within a computing system, new entries may be added or deleted based on the user data. Further, if future usage events are identified by the storage control system, an increased amount of metadata may be located in the SMR portion of the disk.

Figure 6:
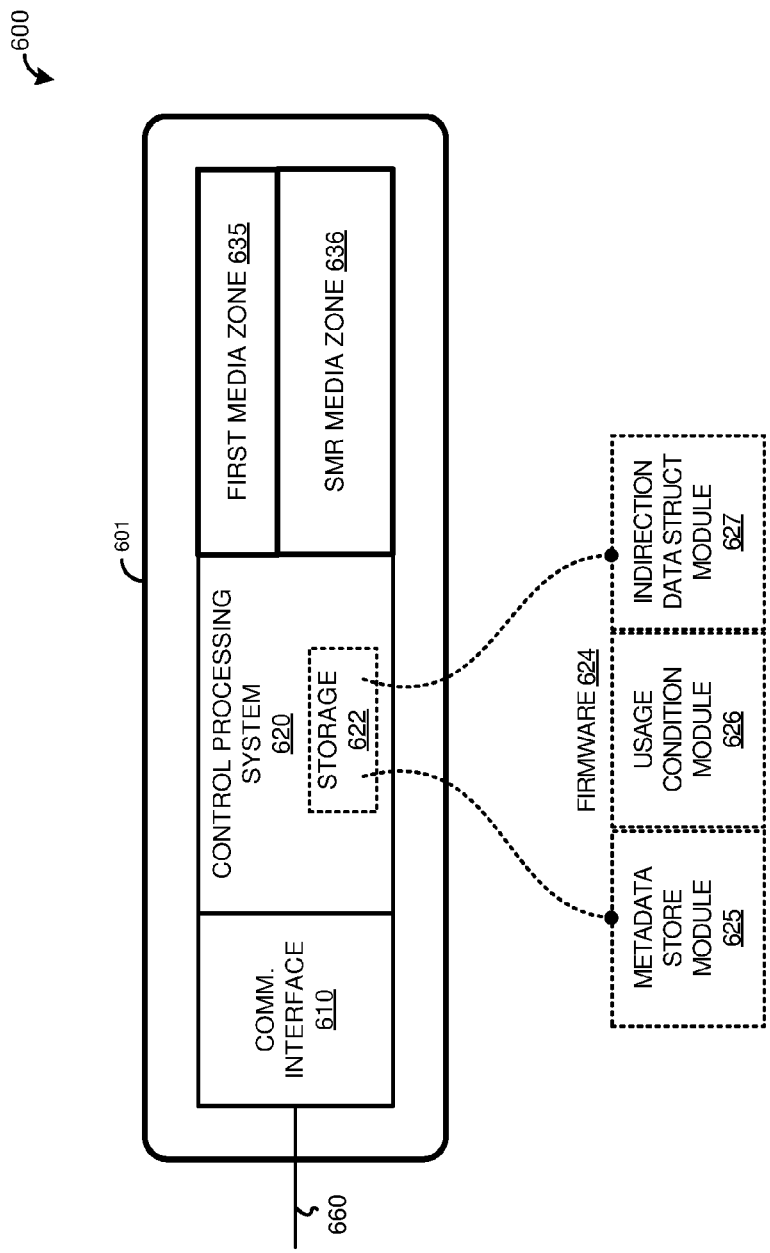
FIG. 6 illustrates a data storage device with multiple storage media zones.

Turning to FIG. 6, FIG. 6 illustrates a data storage device 600 with multiple storage media zones. Data storage device 600 is an example of data storage device 110 from FIG. 1, or data storage device 310 from FIG. 3A, although other examples may exist. Data storage device 600 includes communication interface 610, control processing system 620, first media zone 635, and SMR media zone 636. In operation, control processing system 620 is operatively and communicatively linked to communication interface 610, first media zone 635, and SMR media zone 636. It should be understood that discrete links might be employed, such as individual communication, power, and control links or other circuitry. Data storage device 600 can be distributed or consolidated among equipment or circuitry that together forms the elements of data storage device 600. Data storage device 600 can include enclosure 601 which can enclose or structurally support ones of the elements of data storage device 600. Data storage device 600 can optionally include additional devices, features, or functionality not discussed here for purposes of brevity.

Communication interface 610 includes one or more interfaces for communicating with communication networks, storage data busses, storage data links, or other devices, such as bus 130 of FIG. 1. The interfaces can include any serial or parallel digital interfaces, or other communication and data interfaces, including combinations, variations, and improvements thereof. Examples of communication interface 610 include logic, transmission gates, buffers, network interface card equipment, transceivers, and other communication circuitry. In this example, communication interface 610 communicates over at least link 660. Link 660 can include any communication link as described herein, such as that described for links 130 in FIG. 1.

Control processing system 620, which is an example of storage control system 111 from FIG. 1 and storage control system 305 from FIG. 3A, can comprise one or more microprocessors, microcontrollers, application specific integrated circuit (ASIC) processors, or FPGA elements and other circuitry that retrieves and executes firmware 624 from storage system 622. Control processing system 620 can be implemented within a single processing device but can also be distributed across multiple processing devices or subsystems that cooperate in executing program instructions. Examples of control processing system 620 include general purpose central processing units, application specific processors, and logic devices, as well as any other type of processing device, combinations, or variations thereof.

Storage system 622 can include any computer readable storage media readable by control processing system 620 and capable of storing firmware 624, such as a computer readable storage device. The computer readable storage media that stores firmware 624 can include volatile and nonvolatile, removable and non-removable media implemented in any method or technology for storage of information, such as computer readable instructions, data structures, program modules, or other data. In addition to storage media, in some implementations the computer readable storage media can also include communication media over which firmware 624 can be communicated. The computer readable storage media that stores firmware 624 can be implemented as a single storage device but can also be implemented across multiple storage devices or sub-systems co-located or distributed relative to each other. The computer readable storage media that stores firmware 624 can comprise additional elements, such as a controller, capable of communicating with control processing system 620. Examples of storage media include random access memory, read only memory, flash memory, or any other medium which can be used to store the desired information and that can be accessed by an instruction execution system, as well as any combination or variation thereof, or any other type of storage media. In no case is the storage media a propagated signal.

Firmware 624 can be implemented in program instructions and among other functions can, when executed by data storage device 600 in general or control processing system 620 in particular, direct data storage device 600 or control processing system 620 to process write commands to store data onto magnetic media zones 635-636, process read commands to retrieve data from magnetic media zones 635-636, receive data from other devices and systems, transfer data to other devices and systems, monitor file system metadata stored in magnetic media zones 635-636, report a location of an indirection data structure, amongst other possible operations. Firmware 624 can include additional processes, programs, or components, such as operating system software, database software, or application software. Firmware 624 can also comprise some other form of machine-readable processing instructions executable by control processing system 620.

In at least one example, firmware 624 includes metadata storage module 625, usage condition module 626, and indirection data structure module 627. Metadata storage module 625 maintains file system metadata in a metadata location on first media zone 635 for user data that is stored in SMR media zone 636. Usage condition module 626 identifies when a usage condition is satisfied for the file system metadata in the metadata location, and responsively identifies one or more metadata locations in SMR media zone 636 to redirect storage of at least a subset of the file system metadata. Usage condition module 626 further stores at least the subset of the file system metadata in the one or more metadata locations in the SMR zone. Indirection data structure module 627 maintains an indirection data structure in the metadata location of first media zone 635 that correlates the one or more metadata locations in the SMR zone to the file system metadata.

In general, firmware 624 can, when loaded into storage processor 620 and executed, transform control processing system 620 overall from a general-purpose computing system into a special-purpose computing system customized to manage metadata storage in first media zone 635 and SMR media zone 636, among other operations. Encoding firmware 624 on a computer readable storage media can transform the physical structure of the computer readable storage media. The specific transformation of the physical structure can depend on various factors in different implementations of this description. Examples of such factors can include, but are not limited to, the technology used to implement the storage media of the computer readable storage media and whether the computer readable storage media are characterized as primary or secondary storage. For example, if the computer-storage media are implemented as semiconductor-based memory, firmware 624 can transform the physical state of the semiconductor memory when the program is encoded therein. For example, firmware 624 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

In addition to the operations described above, control processing system 620 includes circuitry, devices, and equipment for transferring write data to magnetic storage media zones 635-636, and reading data from magnetic storage media portions 635-636. In examples of rotating magnetic media, such as hard disk drives, storage control processing system 620 can comprise preamp circuitry, read channel circuitry, servo control systems, channel seek/track systems, write circuitry, step-up voltage converters, buffers, line amplifiers, and other circuitry and equipment.

Storage media zones 635-636 may each comprise one or more platters that include magnetic storage media for storing user data and various metadata as described herein. In particular, storage media zone 635 may comprise a PMR storage media portion, whereas SMR media zone 636 may comprise an SMR storage media portion that writes data to disks using partially overlapping tracks.

Figure 7:
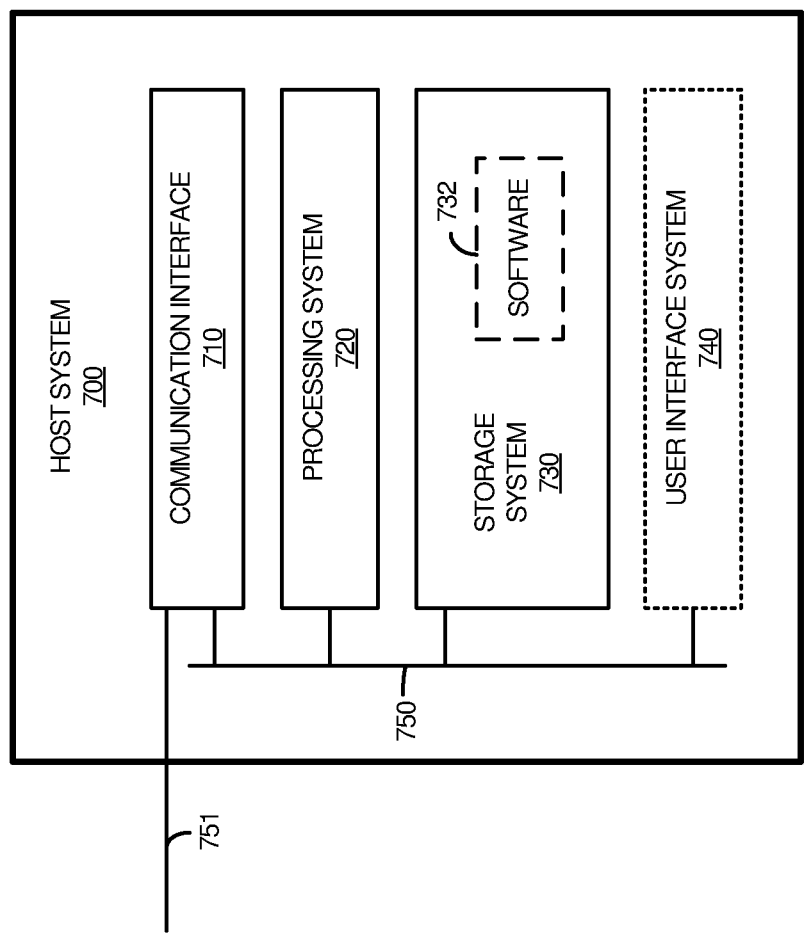
FIG. 7 illustrates a host system to communicatively couple to a data storage device.

FIG. 7 illustrates a host system 700 to communicatively couple to a data storage device. Host system 700 can include equipment and systems as discussed herein for host system 120 in FIG. 1, or host 320 of FIGS. 3A and 3B, although variations are possible. Host system 700 includes communication interface 710, processing system 720, storage system 730, and optionally, user interface system 740. In operation, processing system 720 is operatively linked to communication interface 710, storage system 730, and user interface system 740 by bus 750. It should be understood that discrete links might be employed, such as network links or other circuitry. Host system 700 can be distributed or consolidated among equipment or circuitry that together forms the elements of host system 700. Host system 700 can optionally include additional devices, features, or functionality not discussed here for purposes of brevity.

Communication interface 710 includes one or more interfaces for communicating with communication networks, data busses, data links, or other devices, such as bus 130 of FIG. 1. The interfaces can include any serial or parallel digital interfaces, or other communication and data interfaces, including combinations, variations, and improvements thereof. Examples of communication interface 710 include logic, transmission gates, buffers, network interface card equipment, transceivers, modems, and other communication circuitry. In this example, communication interface 710 communicates over at least link 751. Link 751 can include any communication link as described herein, such as that described for link 130 in FIG. 1.

Processing system 720 can comprise one or more microprocessors and other circuitry that retrieves and executes software 732 from storage system 730. Processing system 720 can be implemented within a single processing device but can also be distributed across multiple processing devices or sub-systems that cooperate in executing program instructions. Examples of processing system 720 include general purpose central processing units, application specific processors, and logic devices, as well as any other type of processing device, combinations, or variations thereof.

Storage system 730 can comprise any computer readable storage media readable by processing system 720 and capable of storing software 732. Storage system 730 can include volatile and nonvolatile, removable and non-removable media implemented in any method or technology for storage of information, such as computer readable instructions, data structures, program modules, or other data. In addition to storage media, in some implementations storage system 730 can also include communication media over which software 732 can be communicated. Storage system 730 can be implemented as a single storage device but can also be implemented across multiple storage devices or sub-systems co-located or distributed relative to each other. Storage system 730 can comprise additional elements, such as a controller, capable of communicating with processing system 720. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 732 can be implemented in program instructions and among other functions can, when executed by host system 700 in general or processing system 720 in particular, direct host system 700 or processing system 720 to instruct data storage devices to identify, find, and alter file system metadata, alter the location and size of an indirection data table, add new files and directories to a file system, edit files and directories in the file system, among other operations. Software 732 can include additional processes, programs, or components, such as operating system software, database software, or application software. Software 732 can also comprise firmware or some other form of machine-readable processing instructions executable by processing system 720.

In at least one example, software 732 may include modules capable of performing similar actions to modules 625-627 illustrated in FIG. 6. Thus, rather than implementing the storage control system within the device itself, the control system may be implemented as one or more processes on host 700. For example, software 732 may maintain file system metadata in a metadata location in a first media zone for user data that is stored in a SMR media zone. Software 732 may further identify when a usage condition is satisfied for the file system metadata in the metadata location, and responsively identify one or more metadata locations in the SMR media zone to redirect and store at least a subset of the file system metadata. Once stored, software 732 may maintain an indirection data structure in the metadata location of the first media zone that correlates the one or more metadata locations in the SMR zone to the file system metadata.

In general, software 732 can, when loaded into processing system 720 and executed, transform processing system 720 overall from a general-purpose computing system into a special-purpose computing system customized to identify, find, and alter file system metadata, alter the location and size of an indirection data table stored on the storage device, add new files and directories to a file system, edit files and directories in the file system, among other operations. Encoding software 732 on storage system 730 can transform the physical structure of storage system 730. The specific transformation of the physical structure can depend on various factors in different implementations of this description. Examples of such factors can include, but are not limited to the technology used to implement the storage media of storage system 730 and whether the computer-storage media are characterized as primary or secondary storage. For example, if the computer-storage media are implemented as semiconductor-based memory, software 732 can transform the physical state of the semiconductor memory when the program is encoded therein. For example, software 732 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Optional user interface system 740 includes equipment and circuitry for receiving user input and control, such as for engaging in storage management operations, displaying error rate or areal density information, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, web interfaces, software interfaces, or other human-interface equipment. User interface system 740 also includes equipment to communicate information to a user of host system 700. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Bus 750 comprises a physical, logical, or virtual communication link, capable of communicating data, control signals, and communications, along with other information. In this example, bus 750 also includes elements such as wires, circuit board traces, solid state interconnect, or other elements. In some examples, portions of bus 750 are encapsulated within the elements of host system 700, and can be a software or logical link. In other examples, bus 750 uses various communication media, such as air, space, metal, optical fiber, or some other signal propagation path, including combinations thereof. Bus 750 could be a direct link or might include various equipment, intermediate components, systems, and networks.

Returning to the elements of FIG. 1, data storage device 110 includes first media zone 115, which may comprise a PMR zone or some other non-shingled track type zone, and SMR media zone 116. Storage control system 111 is shown as an example of processing and interfacing elements of data storage device 110. Data storage device 110 can include further elements, such as those discussed for data storage device 600 in FIG. 6. Data storage device 110 can comprise a hard disk drive or other computer readable storage device. The computer readable storage media of data storage device 110 includes rotating magnetic storage media, such as media zones 115-116, but can additionally include other media, such as employed in a cache or cache system of data storage device 110. These other media can include solid state storage media, optical storage media, non-rotating magnetic media, phase change magnetic media, spin-based storage media, or other storage media, including combinations, variations, and improvements thereof. First media zone 115 can employ PMR or other various non-shingled magnetic storage schemes, and SMR media zone 116 employs an SMR storage scheme. It should be understood that the storage layout of first media zone 115 and SMR media zone 116 is only an example arrangement. First media zone 115 and SMR media zone 116 may use various physical track layouts on the drive platters to store the user data and file system metadata.

Host system 120 can include processing elements, data transfer elements, and user interface elements. In some examples host system 120 is a central processing unit of a computing device or computing system. In other examples, host system 120 also includes memory elements, data storage and transfer elements, controller elements, logic elements, firmware, execution elements, and other processing system components. In yet other examples, host system 120 comprises a RAID controller processor or storage system central processor, such as a microprocessor, microcontroller, Field Programmable Gate Array (FPGA), or other processing and logic device, including combinations thereof. In some instances, host system 120 may include processing instructions that direct the host system to implement the file system metadata operations described for storage control system 111. Host system 120 can include, or interface with, user interface elements, which can allow a user of storage system 100 to control the operations of storage system 100 or to monitor the status or operations of storage system 100. These user interface elements can include graphical or text displays, indicator lights, network interfaces, web interfaces, software interfaces, user input devices, or other user interface elements. Host system 120 can also include interface circuitry and elements for handling communications over bus 130, such as logic, processing portions, buffers, transceivers, and the like.

Bus 130 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although bus 130 is shown in FIG. 1, it should be understood that one or more discrete links might be employed between the elements of storage system 100.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A data storage device with rotating magnetic storage media having a first storage zone and a shingled magnetic recording (SMR) zone, the data storage device comprising a storage control system configured to:
   maintain metadata in a metadata location of the first storage zone for user data that is stored in the SMR zone;
   responsive to a usage condition being satisfied for the metadata in the metadata location:
   identify one or more metadata locations in the SMR zone to redirect storage of at least a subset of the metadata; and
   store at least the subset of the metadata in the one or more metadata locations in the SMR zone; and
   maintain an indirection data structure in the metadata location of the first zone that correlates the one or more metadata locations in the SMR zone to the metadata.

2. The data storage device of claim 1, wherein the first storage zone comprises a perpendicular magnetic recording (PMR) zone.

3. The data storage device of claim 2, wherein the indirection data structure comprises an indirection table with a first amount of entries reserved for the metadata in the PMR zone and a remaining amount of entries reserved for the metadata in the SMR zone.

4. The data storage device of claim 1, wherein a host accesses the indirection data structure to identify, find, and alter the metadata.

5. The data storage device of claim 4, wherein the host can alter at least one of size or location of the indirection data structure.

6. The data storage device of claim 1, wherein the indirection data structure comprises an indirection table to relate logical block addresses (LBAs) for the metadata to physical block addresses (PBAs) for the metadata in the first storage zone or the SMR zone.

7. The data storage device of claim 1, wherein the storage control system is further configured to report a fixed location of the indirection data structure to a host.

8. The data storage device of claim 1, wherein the usage condition comprises a predetermined amount of exhausted storage capacity for the metadata.

9. The data storage device of claim 1, wherein to identify the one or more metadata locations in the SMR zone to redirect storage of at least the subset of the metadata, the storage control system is further configured to:
   identify at least a portion of the metadata that has been modified least recently; and
   identify the one or more metadata locations in the SMR zone to redirect storage of at least the portion of the metadata.

10. An apparatus to manage metadata in rotating magnetic storage media of a data storage device, the data storage device having a first storage zone and a shingled magnetic recording (SMR) zone, the apparatus comprising:
    one or more non-transitory computer readable media; and
    processing instructions stored on the one or more non-transitory computer readable media that, when executed by a processing system, direct the processing system to:
    maintain the metadata in a metadata location of the first storage zone for data that is stored in the SMR zone;
    responsive to a usage condition being satisfied for the metadata in the metadata location:
    identify one or more metadata locations in the SMR zone to redirect storage of at least a subset of the metadata; and
    store at least the subset of the metadata in the one or more metadata locations in the SMR zone; and
    maintain an indirection data structure in the metadata location of the first zone that correlates the one or more metadata locations in the SMR zone to the metadata.

11. The apparatus of claim 10, wherein the first storage zone comprises a perpendicular magnetic recording (PMR) zone.

12. The apparatus of claim 11, wherein the indirection data structure comprises an indirection table with a first amount of entries reserved for the metadata in the PMR zone and a remaining amount of entries reserved for the metadata in the SMR zone.

13. The apparatus of claim 10, wherein the indirection data structure comprises an indirection table to relate logical block addresses (LBAs) for the metadata to physical block addresses (PBAs) for the metadata in the first storage zone or the SMR zone.

14. The apparatus of claim 10, wherein the processing system comprises one of a host processing system on a host or a storage control system in the data storage device.

15. The apparatus of claim 10, wherein the processing instructions further direct the processing system to identify requests from a host to access the indirection data structure to identify, find, and alter the metadata.

16. The apparatus of claim 10, wherein the usage condition comprises a predetermined amount of exhausted storage capacity for the metadata.

17. The apparatus of claim 10, wherein to identify the one or more metadata locations in the SMR zone to redirect storage of at least the subset of the metadata, the processing instructions direct the processing system to:
    identify at least a portion of the metadata that has been modified least recently; and
    identify the one or more metadata locations in the SMR zone to redirect storage of at least the portion of the metadata.

18. The apparatus of claim 10, further comprising the processing system.

19. A data system to manage metadata on a data storage device, the data system comprising:
    a first storage zone on the data storage device;
    a shingled magnetic recording (SMR) zone on the data storage device; and
    a processing system configured to:
        maintain the metadata in a metadata location of the first storage zone for user data that is stored in the SMR zone;
        in response to a usage condition being satisfied for the metadata in the metadata location:
            identify one or more metadata locations in the SMR zone to redirect storage of at least a subset of the metadata; and
            store at least the subset of the metadata in the one or more metadata locations in the SMR zone; and
        maintain an indirection data structure in the metadata location of the first zone that correlates the one or more metadata locations in the SMR zone to the metadata.

20. The data system of claim 19, wherein the processing system comprises processing circuitry located on a host system and/or the data storage device.

21. A system comprising:
    a means for maintaining metadata in a metadata location of a first storage zone for data that is stored in a shingled magnetic recording (SMR) zone;
    a means for, in response to a usage condition being satisfied for the metadata in the metadata location:
        identifying one or more metadata locations in the SMR zone to redirect storage of at least a subset of the metadata; and
        storing at least the subset of the metadata in the one or more metadata locations in the SMR zone; and
    a means for maintaining an indirection data structure in the metadata location of the first zone that correlates the one or more metadata locations in the SMR zone to the metadata.

* * * * *